United States Patent
Dixon et al.

[15] 3,677,218
[45] July 18, 1972

[54] FLUID PRESSURE VARIATION SENSOR AND INDICATOR

[72] Inventors: Thomas P. Dixon, Stratford; Robert J. Worrell, Ansonia, both of Conn.

[73] Assignee: United Aircraft Corporation, East Hartford, Conn.

[22] Filed: Feb. 22, 1971

[21] Appl. No.: 117,476

Related U.S. Application Data

[63] Continuation of Ser. No. 640,237, May 22, 1967, abandoned.

[52] U.S. Cl. ..............................116/70, 73/410, 200/81.4, 244/17.11
[51] Int. Cl. .......................................................G01l 19/12
[58] Field of Search..................73/4, 146.8, 393, 407–419; 74/665 G; 116/65, 70, 112, 117; 244/17.11, 17.25; 200/81.4

[56] References Cited

UNITED STATES PATENTS

| 3,221,703 | 12/1965 | Kalustyan | 116/70 |
| 3,269,186 | 8/1966 | Hebenstreit | 73/393 |
| 3,417,727 | 12/1968 | Nemes | 116/70 |

Primary Examiner—Louis J. Capozi
Attorney—Vernon F. Hauschild

[57] ABSTRACT

A pressure variation sensor and indicator having an expandable, sealed reference pressure capsule positioned within a sealed chamber subjected to a pressure under surveillance so that pressure differential across the walls of the capsule will cause the capsule to move within the chamber to indicate loss of the pressure under surveillance, rupture of the capsule or rupture of the indicator and including quick attach detach means to permit the easy replaceability and interchangeability of the capsule within the chamber without calibration.

9 Claims, 10 Drawing Figures

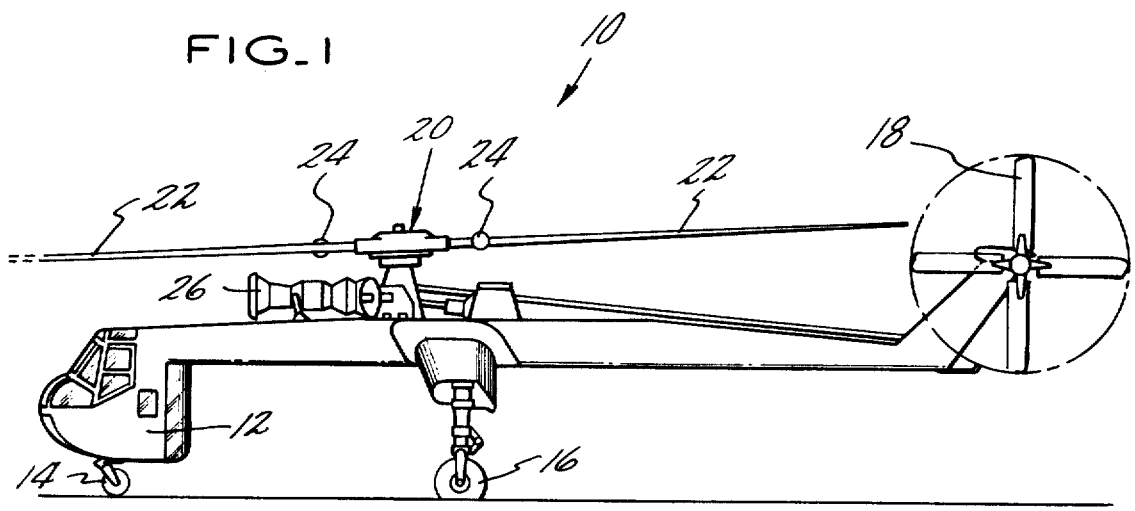
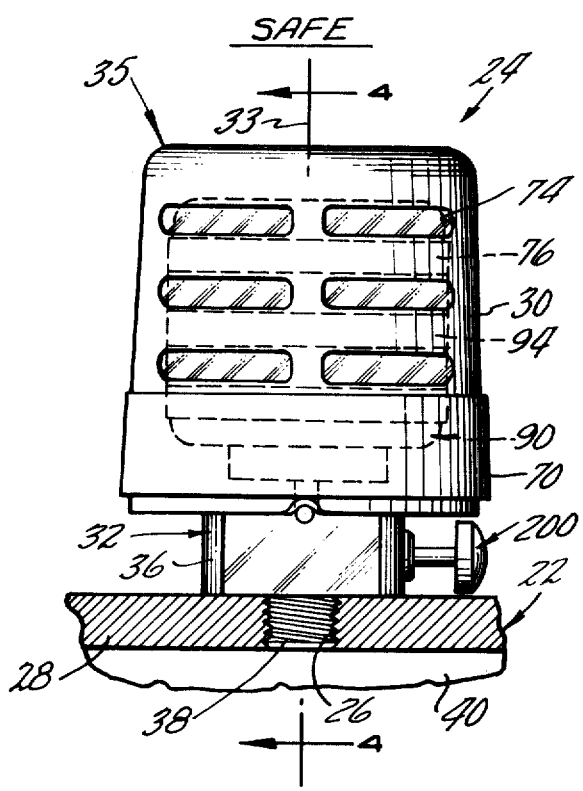
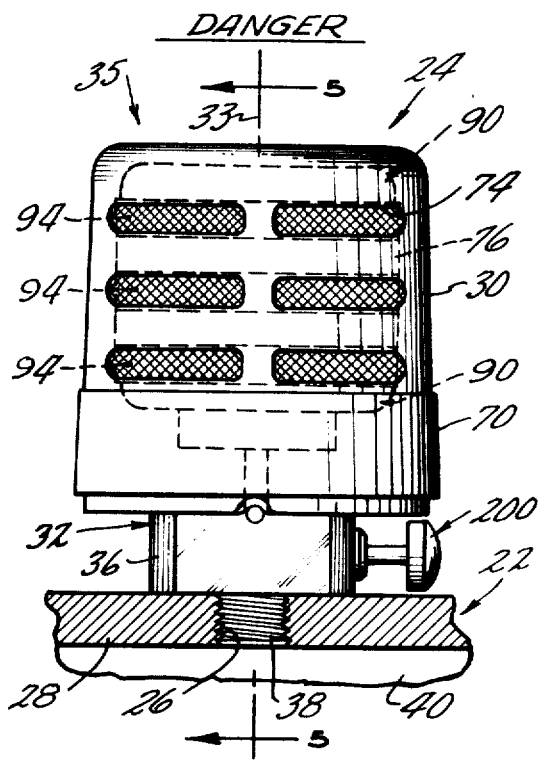
INVENTORS
THOMAS P. DIXON
ROBERT J. WORRELL
BY Vernon F. Hauschild
ATTORNEY

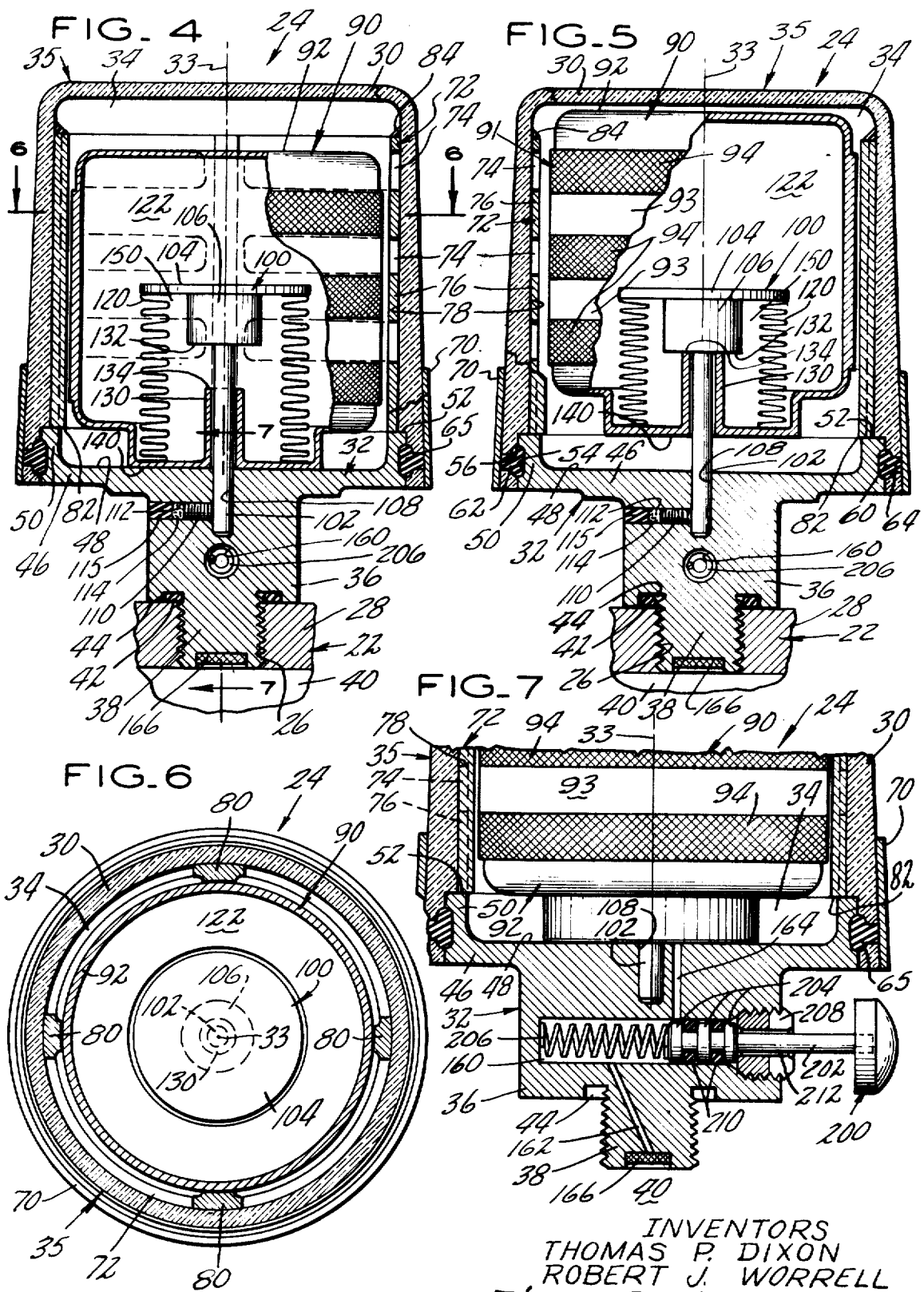

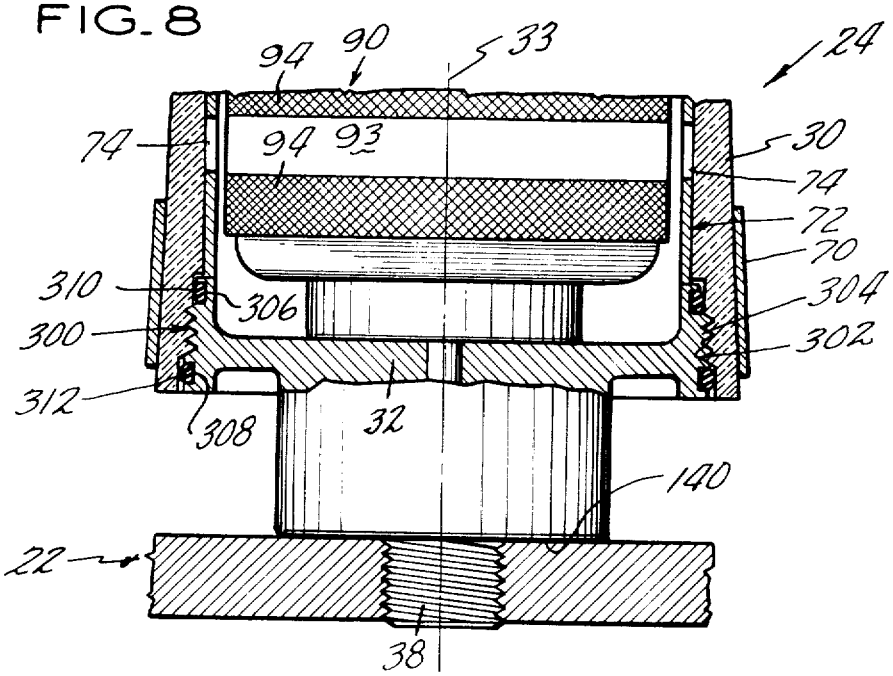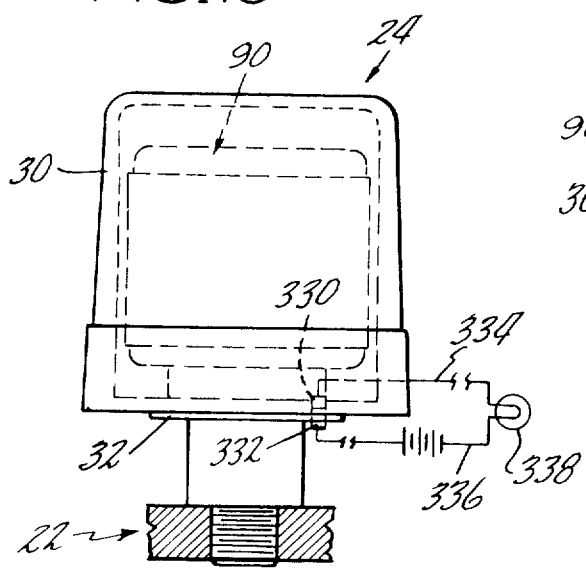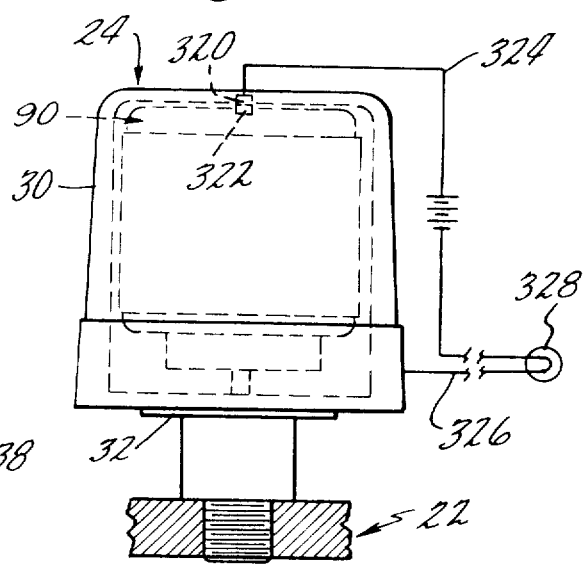

though 
3,677,218

FLUID PRESSURE VARIATION SENSOR AND INDICATOR

CROSS-REFERENCE TO RELATED APPLICATIONS

This is a Continuation application of U.S. Ser. No. 640,237 filed on May 22, 1967, now abandoned.

BACKGROUND OF THE INVENTION

This invention relates to indicators or alarms responsive to fluid pressure variation and in particular to such an indicator or alarm which produces an easily perceptible visual signal in response to small pressure variations and which includes a sealed pressure capsule filled with a referenced pressure which is compared to the pressure to be monitored and which reference pressure capsule is not only replaceable in the field but also completely interchangeable without calibration. This indicator is fail safe in that it provides a warning system both whenever the monitored pressure falls below a selected value and when the indicator has failed. The reference pressure capsule need not be assembled in a pressurized chamber, and is attached to the remainder of the indicator by quick attach-detach mechanism for easy replaceability.

Modern helicopters are propelled by lift rotors which include large rotating blades or wings made of large, hollow load carrying members which are made from one or more parts. These rotor blades are subjected to fluctuating loads and vibrations so that the hollow load carrying members thereof may eventually develop a small crack through the wall thereof, which crack will propagate and eventually cause a catastrophic blade failure. To detect the presence of such a small crack, the hollow load carrying members of the blade are pressurized and an indicator is positioned external of the blade but in communication with the pressurized blade interior and is actuatable in response to loss of blade interior pressure to give a warning signal. It is essential that this warning indicator produce an easily perceptible visual signal in response to small variations in pressure, that the parts of the indicator be easily replaceable in the field and that the parts which are more subject to failure be interchangeable without the need for calibration. In the fluid pressure variation alarm or indicator art, a variety of such indicators are known. Most of these prior art indicators, however, do not provide an easily perceptible visual signal in response to minor pressure variations, which minor pressure variations cause small diaphragm or bellows motions, nor do most of the prior art indicators permit the indicator to be tested in the installed condition. Kalustyan U.S. Pat. No. 3,221,703 teaches an indicator which is both testable when in the installed condition and which produces an elongated and hence easily perceptible visual signal in response to minor pressure variations by utilizing two series of alignable, off-setable stripes so that a small motion of the first series of stripes relative to the second series of stripes between a first position wherein both series of stripes are fully visible and a second position wherein the second series of stripes is hidden behind the first series of stripes. The capsule of the Kalustyan patent, however, has certain disadvantages which the indicator taught herein overcomes. The reference pressure chamber of the Kalustyan patent is not in capsule form and hence not replaceable and, in fact, the Kalustyan patent indicator must be assembled in a pressurized chamber to produce the required reference pressure capsule. This is a severe disadvantage since experience has shown that the reference pressure capsule needs replacement more often than the stationary parts of the indicator. In addition, while the indicator of the Kalustyan patent can be tested in the installed condition, Kalustyan does not teach a fail safe indicator in that his indicator does not provide a warning system when the indicator itself is malfunctioning because either the transparent cover mechanism or the reference pressure chamber defining mechanism has been ruptured.

The indicator taught herein includes a reference pressure capsule which is a completely sealed unit which is attached and installed in the remainder of the indicator by quick attach-detach mechanism and which is easily replaceable and interchangeable in the field without the need for calibration. In addition the indicator taught herein is fail safe in that it provides a warning signal not only when the monitored pressure falls below a preselected value but also when either the outer transparent housing or the reference pressure capsule is ruptured.

SUMMARY OF THE INVENTION

A primary object of the present invention is to provide a visual indicator alarm responsive to fluid pressure variation which provides a readily discernible visual warning signal in response to minor pressure variations in the monitor pressure and in response to small movements within the indicator itself. This indicator is fail safe in operation in that it provides this warning signal both when the monitored pressure falls below a preselected limit and when either the outer transparent casing or the sealed reference pressure capsule in the indicator is ruptured. This indicator also includes provisions for testing the indicator in the installed condition, and still further includes an easily replaceable reference pressure capsule which is fully interchangeable with other reference pressure capsules in the indicator assembly without calibration.

BRIEF DESCRIPTION OF THE DRAWINGS

FIG. 1 is a showing of a conventional helicopter having hollow pressurized rotor blades and showing the pressure variation indicator taught herein in the installed condition.

FIG. 2 is an external view of the pressure variation indicator taught herein in its safe condition.

FIG. 3 is an external view of the pressure variation indicator taught herein in its danger or "pressure loss" condition.

FIG. 4 is a view taken along line 4—4 of FIG. 2.

FIG. 5 is a view taken along line 5—5 of FIG. 3.

FIG. 6 is a view taken along line 6—6 of FIG. 4.

FIG. 7 is a view taken along line 7—7 of FIG. 4.

FIG. 8 is a partial cross-sectional showing of another embodiment of the pressure variation indicator in which the unit is easily disassemblable in the field for replacement of the sealed reference pressure capsule without calibration.

FIG. 9 is an illustration of an embodiment of my pressure variation indicator in which electrical contacts are provided to produce a warning signal in the pilot's cockpit when the device is indicating a malfunction.

FIG. 10 is a second embodiment to illustrate an alternate pilot warning device.

DESCRIPTION OF THE PREFERRED EMBODIMENT

Referring to FIG. 1 we see modern helicopter 10 which includes fuselage 12 supported by tricycle-type landing gears 14 and 16 and which includes anti-torque tail rotor 18 and the main lift rotor 20. Lift rotor 20 has a plurality of blades 22. The number of blades involved is immaterial to this invention. The blades 22 of main rotor 20 are driven in any conventional fashion by one or more engines such as 26.

In modern helicopters, it is essential that the main rotor blades 22 be not only light in weight but also be capable of withstanding the various aerodynamic and other loads and vibrations imparted thereto during helicopter operation. Loss of a helicopter blade is usually catastrophic because the rotor system which carries the blades is therefore thrown out of balance and the lift characteristics of the rotor are destroyed. Helicopter blade failure is frequently caused by small cracks in the hollow load carrying spars, which cracks are very difficult to detect by most inspection methods during their early stages but which propagate rapidly under normal operating conditions so as to eventually produce a blade failure. To permit the detection of cracks in the hollow load carrying members of the blades as soon as these cracks extend through the wall of the hollow load carrying member, these hollow load carrying members are pressurized and indicators of the type taught herein are carried by the blade as shown at 24 and these indicators communicate with the pressurized hollow interior of the load carrying members of blades 22 and provide a visual warning signal when the pressure within the load carrying member is lost or drops below a preselected limit. This loss of pressure generally indicates a crack through the wall of the load carrying member.

For a complete understanding of the construction of helicopter blades 22, reference may be had to U.S. Pat. No. 2,754,918, the subject matter of which is hereby incorporated by reference. In addition, more complete details about helicopter 10 and the drive system between the engines and the main rotor 20 and the anti-torque rotor 18 may be had by reference to U.S. Pats. Nos. 2,979,968 and 2,911,851, the subject matter of which is hereby incorporated by reference.

As best shown in FIGS. 2 through 5, fluid pressure alarm indicator 24 is shown mounted by threaded connection into the threaded aperture 26 in the spaced walls 28 of hollow pressurized helicopter blade 22. Indicator 24 is preferably of generally circular cross section and concentric about axis 33 and includes transparent cap member 30 which is connected to base plate member 32 and cooperates therewith to form sealed rigid casing 35 which defines sealed chamber 34 therewithin. Base plate member 32 includes stem portion 36, which includes threaded projection 38, which threadably engages threaded aperture 26 in the wall 28 of blade 22 in sealing engagement so as to sealably connect indicator 24 to the hollow and pressurized interior 40 of blade 22. Seal member 42 is received in annular recess 44 in stem portion 36 so as to effect a seal connection between the indicator 24 and the blade 22. Stem portion 36 is integrally connected to cylindrical end portion 46 of base plate member 32, which is preferably of one-piece construction. End portion 46 defines base surface 48 and circumferential flange section 50, which in turn defines reference surface 52. Circumferential flange 50 includes annular groove 54, which cooperates with and is in alignment with annular groove 56 in cap member 30 to define annular cavity 60 therebetween. Apertures such as 62 and 64 extend through the wall of cap member 30 to place annular cavity 60 into communication with atmosphere. A curable compound such as EC2216 manufactured by Minnesota Mining and Manufacturing Company may be injected in fluid form through apertures 62 and 64 into annular cavity 60 so as to fill that cavity. When this compound is cured, it adheres to both the cap member 30 and the base plate member 32 so as to form a physical connection and seal 65 therebetween. Retainer ring 70 engages the outer surface of cap member 30 adjacent apertures 62 and 64 and serves to prevent expansion of cap member 30 at its open end or base.

While opaque stripes may be applied directly to the inner wall of cap member 30 so as to provide a series of spaced, circumferential stripes thereagainst, it is deemed preferable to utilize opaque cylindrical (or slightly tapered) window member 72 which, as best shown in FIGS. 2 through 5, includes a series of circumferentially extending cutouts or windows 74 therein, which cutouts are spaced by opaque land rings or circumferential stripes 76. Window member 72 may be cylindrical or slightly tapered so that it snugly engages the inner surface 78 of cap member 30. In cross section, window member 72, like cap member 30, is circular in cross section and concentric about indicator axis 33. As best shown in FIG. 6, window member 72 includes a series of circumferentially spaced and axially extending guide ribs 80 which will serve to center and guide the motion of the referenced pressure capsule to be described hereinafter. It will be noted that window member 72 includes lower surface 82, which abuts reference surface 52 of the base plate member 32 and that the window member 72 extends for substantially the full length of cap member 30 and that circumferential lands 76, are, in effect, a series of axially spaced circumferential opaque stripes which are fixed in position with respect to transparent cap member 30. To positively position window member 72 against reference surface 52 of base plate member 32, a bead of positioning compound 84 is applied around the upper end of member 72 and, when cured in position, serves to positively retain member 72 against reference surface 52.

As best shown in FIGS. 4 and 5, sealed reference pressure capsule 90 is positioned within sealed chamber 34 and is of substantially circular cross section and concentric about axis 33. Reference capsule 90 includes thin walled, hollow member 92, which is of circular cross section and concentric about axis 33, and which bears lightly against ribs 80 of window member 72 for guided motion therewithin. A decal 91 of spaced light stripes 93 and dark stripes 94 is positioned circumferentially about member 92 such that the stripes correspond in position and spacing to the stripes 76 and windows 74 of window member 72 so that as hollow member 92 is moved within sealed chamber 34, dark stripes 94 can either align with stripes 76 of window member 72 so as to be hidden therebehind as shown in FIGS. 2 and 4 or may align with windows or apertures 74 of window member 72 so as to be visible therethrough as shown in FIGS. 3 and 5. Stripes 94 are preferably black or of some bright color, such as red, to be readily discernible.

While capsule 90 has been described as having a decal 91 for the purpose of providing stripes thereon, it will be obvious that the stripes could as well have been painted on if more convenient or placed thereon in any convenient fashion.

Seal reference pressure capsule 90 also includes fixed member 100, best shown in FIGS. 4 and 5, which comprises stem portion 102, circular plate portion 104 and shoulder section 106 connecting members 102 and 104 to define a one-piece fixed member 100. Stem portion 102 is received in aperture 108 of base plate member 32 and a quick attach-detach mechanism, such as set screw 110, secures and positions stem 102 and hence sealed reference capsule 90 with respect to base plate member 32.

Set screw 110 is received in threaded aperture 112 of the stem portion 36 of base plate 32. To prevent moisture from passing around tap screw 110, a wad of cotton 114 is placed in aperture 112 on top of screw 110, and a plug 115 of sealing compound such as the aforementioned EC2216 is placed in aperture 112, outside of the cotton 114, to seal moisture from passing through aperture 112 into the indicatior interior.

As best shown in FIGS. 4 and 5, reference capsule 90 includes expandable and contractable bellows 120 which extends between the periphery of circular plate section 104 of fixed member 100 and the inner wall of hollow member 92. Accordingly, hollow member 92, fixed member 100 and flexible resilient bellows 120 cooperate to define sealed chamber 122 within reference capsule 90. A fluid at a preselected pressure, called the reference pressure, is caused to fill the chamber 122.

Positive stop cylinder 130 projects from hollow member 92 of the reference pressure capsule 90 and serves to limit the movement of movable hollow member 92 with respect to fixed member 100 when surface 132 of shoulder section 106 abuts surface 134 of the stop member 130.

It is an important teaching in the construction of this indicator that movable reference pressure capsule 90 not only be replaceable but also be completely interchangeable with replacement reference capsules 90 in the field without the necessity for calibration between the movable capsule 90 and the remainder of the indicator 24.

It will be evident that capsule 90 is replaceable once cap member 30 is removed from base plate 32 because capsule 90 is secured in position within chamber 34 by means of a quick attach-detach connection, such as stem 102 and set screw 110.

With respect to the interchangeability of capsule 90 without calibration, it will be noted that window member 72 is positioned with respect to base plate 32 by the abutment of surfaces 82 and 52. In addition, movable capsule 90 is positioned with respect to the same base plate 32 by quick attach-detach mechanism 102–110. Accordingly, both fixed window member 72 and hence fixed stripes and windows 76 and 74, respectively, and movable reference capsule 90 and hence movable stripes 93 and 94 are positively positioned with respect to base plate member 32 so that with these fixed and movable parts so installed, calibration therebetween is not necessary. Since the replacement capsule 90 which is used to replace the first capsule 90 will be installed in the same fashion, it will be seen that capsules 90 are accordingly interchangeable without calibration. In addition, since each capsule 90 will be pressurized internally the same amount, there will be no stripe alignment problem during capsule replacement. Capsules 90 are preferably all pressurized to the same pressure by using a uniform method of manufacture such as placing each capsule in a Bell jar which is pressurized to the selected pressure while the capsule still has a pinhole therein so that the capsule is pressurized to the pressure of the Bell jar. While the capsule is still in the Bell jar, the pinhole in the wall thereof is soldered closed so that the capsule is now a sealed capsule of the same pressure as the Bell jar. All capsules 90 will be fabricated in this or a comparable fashion. Accordingly, when a replacement capsule 90 is inserted into indicator 24, no alignment will be necessary to insure that the stripes on the movable and fixed portions of the indicator are in proper alignment. If this were not the case, shimming and other alignment techniques between the fixed and movable parts would be necessary and this is always a difficult procedure and virtually eliminates the prospect of capsule replacement in the field.

Referring to FIGS. 4 and 5, it will be noted that fixed member 100 and reference bellows 120 cooperate to define sealed chamber 150 therewithin as part of sealed chamber 34 and, in a fashion now to be described, sealed chamber 150 is placed into communication with the hollow interior 40 of helicopter blade 22, thereby subjecting sealed chamber 150 and cavity 34 to the monitored pressure within blade 22. As best shown in FIG. 7, lateral conduit 160 in base plate member 32 serves to join conduits 162 and 164 and thereby place the hollow interior 40 of helicopter blade 22 into communication with sealed cavity 34 and hence the interior portion 150 of the bellows 120. Filter 166 is placed at the inlet of conduit 162 to filter out any foreign matter which might otherwise plug conduits 162 and 164.

When sealed chamber 34 and hence chamber 150 are subjected to the blade pressure, which is the pressure to be monitored, and with reference capsule 90 containing a sealed quantity of reference pressure, it will be noted that movable and striped member 90 will be caused to move with respect to fixed member 100, window member 72 and cap member 30 as the blade pressure varies with respect to the reference pressure. In this fashion, by the alignment of stripes 94 with window 74 as shown in FIGS. 3 and 5, a warning signal is produced by indicator 24.

OPERATION

In its pressurized condition and as a replaceable part for the indicator 24, capsule 90 will have its bellows 120 normally contracted wherein the stop 130 contacts the shoulder section of inner member 100. When reference pressure capsule 90 is installed into indicator 24 by the use of quick attach-detach means 110, movable member 92 will be positioned (See FIG. 5) so that the dark stripes 94 of decal 91 are aligned with cutouts 74 of window member 72 so as to be visible through transparent cap 30 to show a warning signal indicating loss of blade pressure. After indicator 24 has been installed into aperture 26 of blade 22 and the pressure from the interior of blade 22 fills chamber 34 and, therefore, chamber 150, movable member 92 of reference capsule 90 will be caused by the pressure differential between the reference pressure and the monitored blade pressure to move toward base plate member 32 so that surface 140 of member 92 bears against reference surface 48 of base plate member 32 (See FIG. 4). With reference capsule 90 so positioned, dark stripes 94 are in alignment with and hence hidden behind stationary stripes 76 so that indicator 24 is giving a safe signal indicating that blade 22 has not lost its pressure.

It is important that with indicator 24 installed onto blade 22, the operating condition of the indicator be testable. This is permitted because, as best shown in FIG. 7, press-to-test button and plunger mechanism 200 is depressible and releasable within conduit 160. This test mechanism includes depressible plunger 202 which includes three lands 204 and which is spring biased by spring 206 to bear against position nut 208. Ring seals such as 210 are positioned between lands 204. With test mechanism in its FIG. 7 position, the interior 40 of blade 22 is in communication with sealed chamber 34 of indicator 24 so that the blade pressure is being compared to the reference pressure. When the indicator is to be tested, plunger 202 is depressed so that lands 204 move leftwardly so as to place sealed chamber 34 in communication with atmosphere through conduits 164 and 160 and the annular conduit 212 around plunger 202. With the plunger in this position, the pressure within sealed chamber 34 is released and, if the indicator is working properly, the reference pressure will cause the movable portion 92 of reference capsule 90 to move to its FIG. 3 and 5 warning position.

When the helicopter is on the ground, indicator 24 is clearly visible to one standing near the helicopter and the normal walk-around pre-flight inspection tour of the pilot or crew chief includes a surveillance of each indicator. Should an indicator show a "failed" indication, the rotor blade may be removed and replaced.

FIG. 8 illustrates another embodiment of the pressure variation indicator 24 in which cap 30 is very easily removable from base plate member 32. In this embodiment, cap 30 and base plate member 32 are connected through cooperating thread mechanisms 300, which include molded coarse female threads 302 in cap 30 and mating threads 304 in base plate 32. To insure a seal between cap 30 and base plate 32, grooves 306 and 308 are provided in base plate 32 and carry O-ring seals 310 and 312, which extend between and hence seal between cap 30 and base plate 32. It will be evident that with the FIG. 8 embodiment, cap 30 may be removed from base plate 32 in the field so as to permit the replacement of the reference pressure capsule 90 without the need for calibration as described herein.

While indicator 24 may be easily examined visually when the helicopter is on the ground, there may be circumstances in which in-flight warning signals are desired. FIG. 9 and 10 illustrate embodiments of the pressure variation indicator 24 which provide warning signals to the pilot in the pilot compartment during flight and at other times as well. In the FIG. 9 embodiment, contact switches 320 and 322 are supported in cap 30 and capsule 32, respectively, and are connected through electric leads 324 and 326 to a warning light illustrated schematically at 328 in FIG. 9 but which is actually located within the pilot compartment. Indicator 24 is shown in its "pressure loss" or danger position in FIG. 9 wherein electric contact 320 and 322 are in contact so as to complete the necessary electric circuit through leads 324 and 326 to illuminate cockpit warning light 328 thereby warning the pilot. When contacts 320 and 322 are out-of-contact, warning light 328 will go out and this will serve as a signal to the pilot that the indicator 24 is in the FIG. 4 safe position indicating pressure in the desired area, such as within the hollow interior 40 of helicopter blade 22.

In the FIG. 10 embodiment, which may be used with the FIG. 9 embodiment or by itself, electric contacts 330 and 332 are positioned in reference capsule 90 and base plate member 32, respectively, and are connected by appropriate electric leads 334 and 336 to cockpit "indicator safe" light 338. As shown in FIG. 10, indicator 24 is in its safe condition and electric contact 330 and 332 are in contact, thereby completing the necessary electric circuit to safe light 338 in cockpit through electric conduits 334 and 336. Accordingly, when light 338 is illuminated, it is a signal to the pilot that there is pressure in the area being monitored, such as the interior 40 of helicopter blade 22 and when cockpit light 338 is not illuminated, it is an indication of loss of pressure. When the embodiments of FIGS. 9 and 10 are used together, it will be noted that when the indicator 24 is operating safely, warning light 328 will be off while safe light 338 will be illuminated. Conversely, when the indicator 24 is indicating loss of pressure, warning light 328 will be illuminated while safe light 338 will be off.

It will be evident to those skilled in the art that the electric warning systems just described in connection with FIGS. 9 and 10 can be used individually, concurrently and with or without the visual warning system described in connection with FIGS. 2–7.

The requirement for a cockpit indication of blade pressure loss becomes more important as the length of the flight or mission increases. Such increase to flight time is made possible by the air-to-air refueling systems which are now in use on helicopters.

It will be obvious that while one form of replaceable capsule is illustrated here, other forms of replaceable capsules are also possible. For example, while the capsule could be inverted and attached directly to the base plate with the bellows positioned at the top thereof so as to carry a movable, stripped cap member, such a construction produces calibration problems.

In addition, while a particular embodiment has been illustrated to utilize this pressure variation sensor, it will be evident that there are other uses for such a sensor. Actually, this sensor could be used in conjunction with any pressurized vessel to detect loss of pressure. For example, this sensor could be used to detect cracks in pressurized shafts, to detect the loss of pressure in the nitrogen pressurized telephone cables and any other pressurized conduit or vessel.

It is to be understood that the invention is not limited to the specific embodiment herein illustrated and described but may be used in other ways without departure from its spirit as defined by the following claims.

We claim:

1. A pressure sensitive indicating instrument for providing a visual signal in response to fluid pressure variation comprising:
   A. casing means defining a sealed chamber, and including:
      1. a transparent portion having spaced opaque stripes,
   B. means for placing said sealed chamber into communication with a pressure source to be monitored,
   C. a sealed capsule located within said chamber and having a reference pressure sealed therewithin, and including:
      1. a fixed wall section,
      2. a flexible wall section connected to said fixed wall section and fabricated to be expandable and contractible in accordance with variation of pressure differential across the walls thereof,
      3. spaced stripes defining means corresponding to the spaced stripes of said transparent portion and connected to said flexible wall section for movement therewith,
   D. quick attach-detach means connecting the fixed wall portion of said capsule to said casing means to position said capsule in said chamber so that when said chamber is pressurized, said capsule is moved in a first direction and said stripes on said capsule and of said transparent portion are in alignment and so that when said chamber is not pressurized said capsule is moved in a second direction opposite to said first direction and said stripes on the capsule and the transparent portion are out of alignment,
   E. and positive stop means connected to said capsule flexible wall section and of selected size to abut said fixed wall portion to limit the movement of said spaced stripes defining means so that its stripes are out of alignment with said transparent portion stripes so as to be visible through said transparent portion and thereby give a warning signal when the pressure in said chamber is reduced a preselected amount below said reference pressure.
   F. and wherein said sealed chamber defining means further includes:
      1. a base plate member having a threaded stem portion projecting therefrom,
      2. a cylindrical portion integrally attached to said stem portion,
         a. an annular groove in the periphery of said cylindrical portion,
         b. a recessed aperture in said cylindircal portion and,
         c. first conduit means extending through said stem portion and said cylindrical portion,
      3. a transparent cap member of substantially circular cross section and adapted to be received over said cylindrical portion of said base plate member to cooperate therewith in defining a sealed chamber therewithin and having,
         a. an annular groove adjacent the open end of said cap member and positioned to cooperate with said annular groove in said base plate member to define an annular cavity therebetween,
      4. a ring member positioned in said annular cavity and contacting said base plate member and said cap member to form a seal and retainer therebetween.
   G. and still further wherein said instrument is of substantially circular cross section and concentric about an axis and including:
      1. a window member of circular cross section sleeved into the interior of said cap member and extending for substantially the full height thereof and including:
         a. spaced circumferential apertures to permit visibility through said apertures and said cap member into said sealed chamber,
         b. circumferentially spaced guide ribs projecting towards said axis from the inner surface of said window member and extending along said axis, and
         c. a reference surface,
      2. means to fixedly position said window member so that said reference surfaces of said window member and said base plate member abut.

2. Apparatus according to claim 1 and wherein said sealed capsule is positioned within said window member and includes:
   A. a fixed member having:
      1. a stem portion received into said aperture of said base plate member,
      2. a circular plate section,
      3. means connecting said stem section and said plate section so that said stem section supports said plate section within said sealed chamber from said base plate member,
   B. a thin walled, hollow member of circular cross section and concentric about said axis located within said window member and bearing lightly against said guide ribs thereof for motion therewithin and having:
      1. spaced stripes on the outer surface thereof corresponding with said circumferential apertures in said cylindrical window member,
      2. a positive stop member adapted to contact said fixed member to limit relative motion therebetween in one direction,
      3. and an aperture adjacent said base plate member and constituting the sole opening therein,
   C. an expandable bellows of circular cross section and concentric about said axis and sealably joining said fixed member and said hollow member at said cylindrical plate portion and said aperture to permit relative motion therebetween and to define a first sealed chamber within said bellows and a second sealed chamber between said bellows, said hollow member and said cylindrical plate portion, and
   D. quick attach-detach means to rigidly position said stem portion within said base plate member recessed aperture so as to make said sealed capsule easily replaceable and also to position said sealed capsule with respect to said base plate member whereby said sealed capsule is interchangeable without calibration with respect to said window member since said window member is also positively positioned with respect to said base plate member.

3. A pressure sensitive indicating instrument comprising:
   A. means defining a sealed chamber and including:

1. a base plate member having:
   a. a threaded stem portion projecting therefrom,
   b. a cylindrical portion integrally attached to said stem portion and having a recessed aperture therein,
2. a transparent cap member of substantially circular cross section and adapted to be received over said cylindrical portion of said base plate member to cooperate therewith in defining a sealed chamber therewithin,
3. a window member of circular cross section sleeved into the interior of said cap member and extending for substantially the full height thereof and including:
   a. spaced circumferential apertures to permit visability through said apertures and said cap member into said sealed chamber,
B. means for introducing the pressure to be monitored into said chamber,
C. a sealed capsule located in said sealed chamber and containing a reference pressure and including:
   1. a thin-walled hollow member of circular cross section having spaced stripes on the outer surface thereof corresponding with said spaced circumferential apertures,
   2. a fixed member having a stem portion received into said aperture of said base plate member,
   3. a flexible bellows sealably joining said fixed member and said hollow member to form the sealed capsule adapted to move in response to variation in pressure differential thereacross,
   4. quick attach-detach means to rigidly retain said stem portion within said base plate member recessed aperture,
   5. first positive stop means internal to said hollow member to limit motion of said hollow member in a first direction whereby said spaced stripes on said hollow member are out of alignment with the apertures of said window member,
D. second stop means on said base plate member to limit motion of said hollow member in a second direction whereby said spaced stripes on said hollow member are in alignment with the apertures of said window member.

4. Apparatus according to claim 3 wherein said base plate member includes:
A. an annular groove in the periphery of said cylindrical portion of said base plate member,
B. an annular groove adjacent the open end of said cap member and positioned to cooperate with said annular groove in said base plate member to define an annular cavity therebetween,
C. a ring member positioned in said annular cavity and contacting said base plate member and said cap member to form a seal and retainer therebetween.

5. A pressure sensitive indicating instrument for providing a visual signal in response to fluid pressure variation comprising:
A. a rigid casing defining a sealed chamber therewithin,
B. means for introducing the fluid pressure to be monitored into said chamber,
C. a sealed reference pressure capsule having a reference pressure sealed therewithin and located in said chamber so as to be subjected to the pressure to be monitored on the exterior thereof and including:
   1. a fixed portion having:
      a. a plate member, and
      c. a stem member having one end connected to said plate member and its other end connected to said rigid casing to support said plate member in spaced relation to said rigid casing,
   2. a movable portion having first stripe means located on the outer exterior thereof,
   3. flexible bellows means connecting said plate member to said movable portion and cooperating therewith in defining said sealed reference pressure capsule and movable in response to pressure differential changes between said reference pressure and the monitored pressure to thereby cause said movable portion to move with respect to said fixed portion in response to said pressure differential changes,
D. pressure indicating means comprising an electric circuit including:
   1. electrically actuatable signal means,
   2. electric contacts attached to said casing and said movable portion of said capsule,
   3. and means connecting said signal means to said contacts so that variations of the pressure in said chamber cause said movable portion to move and bring said electric contacts into or out of contact to thereby actuate said signal means to indicate the condition of the monitored pressure in said chamber.

6. A pressure indicator comprising:
A. sealed chamber defining means including:
   1. a transparent cap,
   2. a base member sealably connected to said cap and cooperating therewith to define said sealed chamber,
B. means connecting a pressure source to be monitored to said sealed chamber,
C. a sealed reference pressure capsule having a reference pressure sealed therewithin and located in said chamber so as to be subjected to the pressure to be monitored on the exterior thereof and including:
   1. a fixed portion having:
      a. a plate member, and
      b. a stem member having one end connected to said plate member and its other end connected to said base member to support said plate member in spaced relation to said base member,
   2. a movable portion having first stripe means located on the outer exterior thereof,
   3. flexible bellows means connecting said plate member to said movable portion and cooperating therewith in defining said sealed reference pressure capsule and movable in response to pressure differential changes between said reference pressure and the monitored pressure to thereby cause said movable portion to move with respect to said fixed portion in response to said pressure differential changes,
D. and second stripe means corresponding to said first stripe means and fixed with respect to said transparent capsule and selectively positioned to cooperate with said first stripe means to indicate movement of said movable portion of said capsule in response to changes in pressure differential between the monitored pressure and the reference pressure.

7. Apparatus according to claim 6 and including:
A. quick attach-detach means connecting said stem member to said base member to thereby fix said fixed portion of said capsule with respect to said base member.

8. Apparatus according to claim 6 and including:
A. guide means extending between the interior of said cap and the exterior of said movable portion of said capsule and positioned to guide the movement of said movable portion of said capsule within said cap.

9. Apparatus according to claim 6 wherein said flexible bellows means is dimensioned so that when said sealed reference pressure capsule is installed in said sealed chamber defining means, said first stripe means on said movable portion of said capsule assume a first, warning position with respect to said second stripe means before the monitored pressure is introduced into said sealed chamber, and so that said first stripe means assume a second, safe position relative to said second stripe means when the monitored pressure is introduced into said sealed chamber, so that either loss of said reference pressure or rupture of said capsule will cause said first means to assume said first, warning position.

* * * * *